J. P. CASSIDY.
PIPE LIFTER.
APPLICATION FILED JUNE 7, 1920.

1,420,621.

Patented June 27, 1922.

J. P. Cassidy,
INVENTOR

BY Victor J. Evans
ATTORNEY

WITNESS:

UNITED STATES PATENT OFFICE.

JOHN P. CASSIDY, OF AURORA, ONTARIO, CANADA.

PIPE LIFTER.

1,420,621.　　　　Specification of Letters Patent.　　Patented June 27, 1922.

Application filed June 7, 1920. Serial No. 387,163.

*To all whom it may concern:*

Be it known that I, JOHN P. CASSIDY, a subject of the King of Great Britain, residing at Aurora, in the Province of Ontario, and Dominion of Canada, have invented new and useful Improvements in Pipe Lifters, of which the following is a specification.

This invention relates to devices for handling pipes and is especially designed for gripping and recovering lost pipe sections from wells and the like.

An object of the invention is the provision of a device of this character which may be inserted into a pipe section to take hold of or grip the pipe, the invention including novel expanding jaws which securely hold the pipe until purposely released.

With the above and other objects in view, the invention further includes the following novel features and details of construction, to be hereinafter more fully described, illustrated in the accompanying drawings and pointed out in the claim hereto appended.

In the drawings:—

Figure 1:
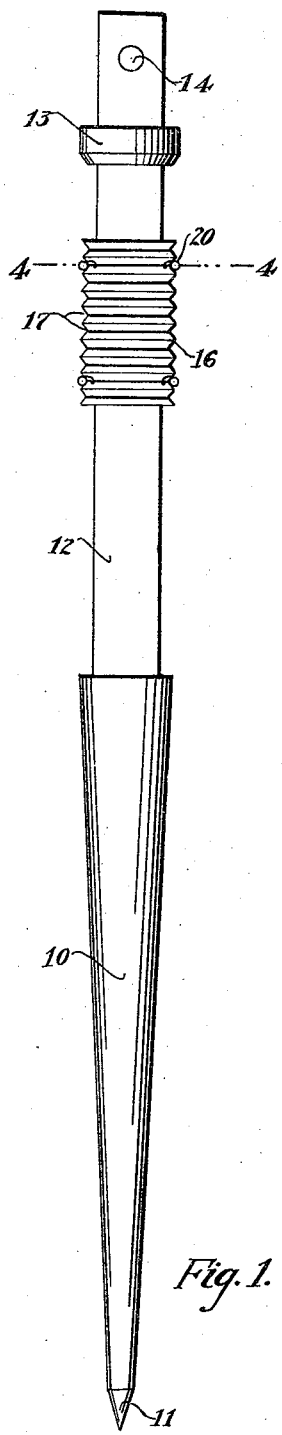
Figure 1 is a side elevation of the invention.
Figure 2:
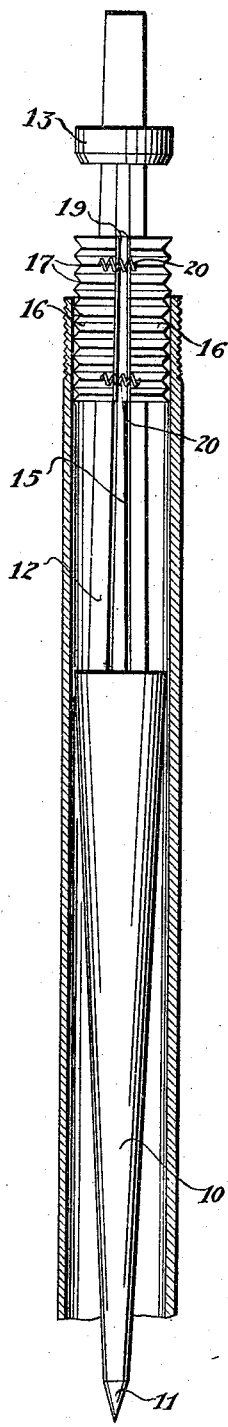
Figure 2 is a similar view at right angles to Figure 1 and shows the jaws expanded and gripping the pipe, the latter being shown in sections.
Figure 3:
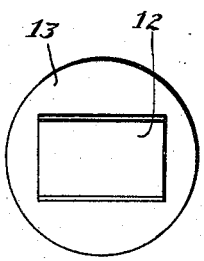
Figure 3 is a top view of the invention per se.
Figure 4:
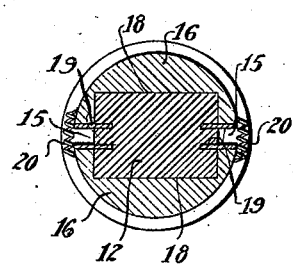
Figure 4 is an enlarged transverse section on the line 4—4 of Figure 1.

Referring in detail to the drawings, wherein like characters of reference denote corresponding parts, the invention as shown comprises an elongated tapered member 10, which is preferably circular in cross section and is provided at its smaller end with a point 11. Extending from the opposite or large end of the member 10 is a shank 12 of rectangular formation, which tapers towards its outer end and is provided adjacent said end with a collar 13. An opening 14 is formed in the shank 12 between this collar and the extremity of the shank, to provide means for the attachment of a shackle (not shown).

The tapered shank 12 is formed upon opposite sides with longitudinally disposed tapered grooves 15, while mounted for sliding movement on the said shank are oppositely located gripping jaws 16. These jaws are provided with transversely arranged grooves 17, which provide gripping edges or teeth for engagement with the walls of the pipe bore. Each of the jaws 16 is provided upon their opposed faces with grooves 18, while extending along the opposite edges of these grooves and projecting inwardly beyond said edges are plates 19, which are adapted to enter the grooves 15 for the purpose of holding the jaws in sliding engagement with the shank. Springs 20 positioned upon each side of the grooves 18, serve to connect the jaws.

In the use of the invention, the same is inserted in the pipe section with the sharpened end 11 entering first and acting as a guide. The jaws 16 will then contact with the walls of the pipe bore and any movement in an opposite direction will cause the jaws to slide downward or toward the large end of the shank 12 and tightly engage the pipe, so that the latter is lifted by connection with the shackle. Should it be necessary, the device may be removed by slightly tapping the end of the shank with a hammer.

The invention is susceptible of various changes in its form, proportions and minor details of construction and the right is herein reserved to make such changes as properly fall within the scope of the appended claim.

Having described the invention what is claimed is:

A pipe gripping device including a tapered rectangular shank, having longitudinally disposed relatively inclined grooves upon opposite sides thereof, transversely grooved expansible gripping jaws slidable on said shank, said jaws having their opposed faces longitudinally grooved to receive the shank, inwardly extending flanges located in each side of the grooves for sliding engagement with the inclined grooves of the shank, whereby the jaws will be expanded and contracted when moved longitudinally of the shank and springs connecting the jaws.

In testimony whereof I affix my signature.

JOHN P. CASSIDY.